United States Patent Office 2,820,068
Patented Jan. 14, 1958

2,820,068

MANUFACTURE OF HALOGEN COMPOUNDS

George L. Cunningham, Cleveland Heights, Ohio, assignor to Horizons Incorporated No Drawing. Application March 9, 1955
Serial No. 493,310

4 Claims. (Cl. 260—659)

This invention relates to the manufacture of halogen substituted organic compounds. More particularly it relates to a new and novel cyclic process for producing halogen derivatives of such organic materials as hydrocarbons, alcohols, acids and the like, together with sodium sulfate, from an organic compound, sulfur and an alkali metal salt of the desired halogen.

My invention is applicable to the production of a wide variety of halogen derivatives of organic compounds, a class of materials which is becoming increasingly important in present industrial processes. Examples of the halogen derivatives which may be prepared in accordance with the process herein disclosed are methyl chloride, ethyl chloride, ethylene chloride (1,2 dichloroethane), and other chlorinated, fluorinated, brominated or iodinated ethanes or other organic compounds, among others too numerous to list which will be readily appreciated by those skilled in the art.

Prior processes for the production of halogen derivatives of organic compounds may be grouped generally in the following manner:

(1) Reactions with the halogen in elemental form
(2) Reactions in which the halogen, as a hydrogen halide, is added to an unsaturated bond, and
(3) Reactions in which the halogen, as a hydrogen halide, is reacted with a hydroxy substituent.

These reactions have been widely utilized in the past, but have been found to suffer a serious economic disadvantage, since the processes require that the halogen be provided either in the form of elemental halogen or as a hydrogen halide. Hence, the ultimate cost depends in no small measure on the cost of furnishing the halogen in the required form.

Most of the processes presently employed for the production of elemental halogens involve electrolytic techniques and require relatively large amounts of electrical energy. For example, the major portion of the chlorine produced in large quantities is manufactured by the electrolysis of sodium chloride which also produces sodium hydroxide in equivalent amounts. The present demands for chlorine are such that a real problem exists in finding means to dispose of the excess caustic produced incident to the manufacture of the desired amounts of chlorine. Accordingly any process which is capable of producing halogen substituted organic compounds by a procedure which does not involve either the use of the halogen in elemental form or the hydrogen halide, is in effect equivalent to producing the halogen without concurrent production of caustic (NaOH) and is therefore economically very attractive.

One object of my invention is to provide a new and novel process for the preparation of halogen substituted organic compounds in which the requirement for the halogen to be either in the elemental form or in the form of a hydrogen halide is avoided.

Another object of my invention is to provide a process in which the products produced concurrently with the halogen substituted organic compound are returned to the system in a form in which they may participate in a reaction to convert additional organic material to the desired halogenated compound, whereby a cyclic process results, producing an economy of operation which has hitherto not been realized.

Another object of my invention is to provide a process wherein halogen substituted organic compounds are prepared directly by reactions in which the halogen is supplied in the form of an inorganic halide and in which the halide so-provided is recovered as the halogen substituted organic compound and not as a hydrogen halide.

These and other objects will become more apparent from the following description.

The preparation of sulfuryl chloride ($SO_2Cl_2$) and mixtures of sulfur dioxide and chlorine by the action of sulfur trioxide on the alkali metal halides is described in U. S. Patents 2,259,248 and 2,441,550 among others. It is also known that sulfuryl chloride can be reacted with various organic compounds to produce halogen substituted organic compounds. Typical prior art disclosures of this reaction are found in U. S. Patents 1,045,139; 1,235,283 and 2,302,228.

Two more recent patents, namely U. S. Patents 2,698,347 and 2,698,348 disclose a process in which sulfur trioxide and an alkali metal halide are reacted directly with an organic material to produce a halogen substituted organic compound, sulfur dioxide, a hydrogen halide and an alkali metal sulfate. In essence the process is a combination of the above-noted prior art teachings in a reaction in which the desired halogen substituted organic compound is produced directly in a single reaction, thus avoiding the necessity for first producing sulfuryl chloride and then reacting it with an organic compound.

In the process described in U. S. Patents 2,698,347 and 2,698,348, by using an alkali metal chloride to produce a halogen substituted organic compound, the use of the halogen in either elemental form or as a hydrogen halide is avoided, which is in effect equivalent to producing chlorine without the concurrent production of sodium hydroxide. However the aforesaid patented process produces a hydrogen halide, such as hydrogen chloride, as a by-product, for which there is presently even less demand than exists for sodium hydroxide. Furthermore the by-product halide wastefully consumes one half of the available halide which is provided by the alkali metal halide and which it would be desirable to recover in the form of a halogen substituted organic compound.

I have now discovered that halogen derivatives of organic compounds can be made directly from an organic material and an inorganic halide in a cyclic process, whereby the production of a hydrogen halide is avoided. In general, the first portion of my process is similar to the above-identified process described in U. S. Patent 2,698,347 insofar as it comprises the introduction of one or more halogen substituents into an organic compound by the action of an alkali metal halide of the desired halogen on the organic compound in the presence of sulfur trioxide. The organic compound and sulfur trioxide are concurrently introduced into contact with the alkali metal halide at an appropriate temperature.

The reactions may be represented schematically in the following equations in which M represents an alkali metal, X is a halogen and R and R' are an organic compound and radical, respectively:

(I)
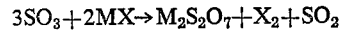

or (Ia)
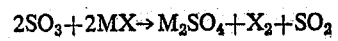

and (II)
$$R + X_2 \rightarrow R'X + HX$$

While I do not know the exact mechanism of this reaction, and it is to be understood that my invention is not to be limited by any considerations of such mechanisms, I believe that the sulfur trioxide reacts with the inorganic halide to form a mixture of sulfur dioxide and free halogen gas with perhaps a small amount of sulfuryl chloride, and an inorganic sulfate. The elemental halogen reacts with the organic material forming the desired halogen-substituted organic compound and a hydrogen halide. In practice, the proportions of the reactants, the temperature and other conditions can be varied so that the major product is either a monohalogenated compound, or one containing more than one halogen atom in the substituted organic compound produced.

As indicated above, the reaction produces the desired halogen derivative of the organic material plus sulfur dioxide, a hydrogen halide and an alkali metal sulfate. The first three of these are ordinarily in the gaseous state at the reaction temperatures and may be withdrawn from the reactor as gases by means of an outlet above the reaction zone. The alkali metal sulfate, and alkali metal acid sulfate, together with alkali metal halide-forming part of the charge, are ordinarily fluid at the reaction temperatures and may be withdrawn from the reactor by means of another suitable outlet.

As above described, the gaseous products withdrawn from the reactor, comprise mainly halogenated organic compounds, sulfur dioxide, a hydrogen halide and some sulfur trioxide plus a small amount of unreacted organic compounds. These gases are either cooled to condense the halogenated organic compound or if the desired product is not readily condensed, the gases are cooled and scrubbed with a suitable solvent to remove the halogen substituted organic material. The remaining gases are mainly sulfur dioxide and a hydrogen halide. These gases are scrubbed in a suitable water scrubber to separate the hydrogen halide from most of the sulfur dioxide, which passes out of the scrubber in gaseous form. The sulfur dioxide may be returned to an oxidizer for conversion to sulfur trioxide to be used in the next cycle of the process.

In the next phase of my process, the values present in the aqueous solution from the scrubber and the molten sulfate product withdrawn from the reactor are reacted to regenerate products uesful in carrying out the initial reactions above described. The recovery process may be schematically expressed as follows:

(III)
$$M_2SO_4 + 2HX \rightarrow 2MX + H_2SO_4$$

(IV)
$$MHSO_4 + HX \rightarrow MX + H_2SO_4$$

The above reaction is effected between a solid sulfate obtained by cooling the molten salt product withdrawn from the reactor and the aqueous hydrogen halide obtained from the scrubber. The two materials are brought together and cooled to about room temperature or below. The alkali metal halide formed is relatively insoluble in the solution and precipitates. It is separated by filtration and is dried and returned to the reactor for the next cycle.

To further illustrate my improved process, it will be described in the production of ethyl chloride from ethane, sodium chloride and sulfur trioxide. In this instance, the specific reactions become:

(I)
$$3SO_3 + 2NaCl \rightarrow Na_2S_2O_7 + Cl_2 + SO_2$$

or (Ia)
$$2SO_3 + 2NaCl \rightarrow Na_2SO_4 + Cl_2 + SO_2$$

(II)
$$C_2H_6 + Cl_2 \rightarrow C_2H_5Cl + HCl$$

These may be combined to give an overall reaction taking place in the reactor as:

$$2SO_3 + 2NaCl + C_2H_6 \rightarrow Na_2SO_4 + C_2H_5Cl + SO_2 + HCl$$

The sodium sulfate produced in this reaction is withdrawn from the reactor (together with some sodium chloride) and is converted to sodium chloride in the following manner.

The molten salts are cooled to approximately room temperature whereupon the sodium sulfate, sodium acid sulfate, and sodium chloride solidify. The solid salts are added to the aqueous slurry of hydrogen chloride obtained from the scrubber, preferably in amounts so that one mole of sodium sulfate is added for every two moles of hydrogen chloride. The resulting slurry is stirred and brought to approximately room temperature or below. The hydrogen chloride reacts with the sodium sulfate and the sodium acid sulfate to form sodium chloride and sulfuric acid. The sodium chloride precipitates from the mother liquor in which it is relatively insoluble. By proper control of the reaction conditions such as temperature, concentration, proportions, etc., 90% of the sodium contained in the sulfate and the acid sulfate may be recovered as a precipitate of sodium chloride. The sodium chloride recovered consists of both the sodium chloride produced from the sulfate, and the acid sulfate and that withdrawn from the reactor along with the sulfate. It is returned to the fused mass in the reactor, or is used in the next cycle of operations.

The mother liquor from this operation contains sulfuric acid, some sodium chloride and water. Upon heating the mother liquor to the point where hydrogen chloride (HCl) is evolved, the sodium chloride reacts with sulfuric acid and is converted back to hydrogen chloride and any vapors given off are recycled to the reactor where they are absorbed in the melt. The remainder of the mother liquor is sulfuric acid containing a small amount of sodium acid sulfate and water. This is evaporated to remove some of the water and the concentrated solution is then cooled to about room temperature. The small amount of sodium acid sulfate (NaHSO$_4$) precipitated is separated by filtration, for return to the reactor. The sulfuric acid solution can be sold as such or if desired, it can be reacted with elemental sulfur to produce relatively concentrated sulfur dioxide and water. The gases from this reaction will contain approximately 50% sulfur dioxide by volume, and this gas may be cooled to condense out the major portion of the water giving a still more concentrated sulfur dioxide gas. This wet sulfur dioxide gas may be passed through concentrated sulfuric acid, or some other suitable drying agent to produce high purity sulfur dioxide gas. This gas may be compressed and cooled down to produce liquid sulfur dioxide which may be sold. Alternately, the sulfur dioxide may be converted to sulfur trioxide for reuse in the process, by reaction with oxygen. These reactions are shown below:

(V)
$$2H_2SO_4 + S \rightarrow 3SO_2 + 2H_2O$$

(VI)
$$2SO_2 + O_2 \rightarrow 2SO_3$$

When the foregoing reactions are combined, the overall reaction for my cyclic process is:

(VII) $\quad 2NaCl + 2R + (S) \rightarrow Na_2SO_4 + 2R'Cl$ where S represents the sulfur input to the reaction.

Thus it can be seen that the only by-product produced in my cyclic process in addition to the desired halogen substituted organic compound is sodium sulfate. As shown in the overall reaction, the raw materials employed are an organic compound, an alkali metal halide salt, sulfur and air or oxygen. If it is not desired to process the sulfuric acid recovered from the mother liquor in the procedure above-described, sulfuric acid will also be a by-product.

The sulfur trioxide used in the process can be either a concentrated material or it can be used as a relatively dilute stream accompanied by a substantial proportion of inert gases. A particular virtue of the process is that the sulfur trioxide produced in a catalytic converter of a contact sulfuric acid plant can be used. Such gas, obtained by the catalytic oxidation with air of sulfur dioxide contains about 8 to 11 mole percent of sulfur trioxide. The sulfur dioxide produced in the first step is sent back to the catalytic converters to be converted to sulfur trioxide.

While the process has been described specifically for the use of sodium chloride, other alkali metal halides such as potassium chloride may be used instead. In addition, a mixture of the alkali metal halides may be used in place of sodium chloride. The use of mixtures of alkali metal halides is of some advantage since such mixed halides have lower melting points and serve to assure that the bath used in the first step is liquid at the temperatures used in the reaction.

The process can be utilized to advantage for numerous different feed materials and products. The following example demonstrates the process as applied with ethane. The example is given for the purpose of illustrating the scope of my invention and is not to be inferred as any limitation thereof.

Example 1

A gaseous mixture composed of 480 parts of sulfur trioxide and 120 parts of ethane by weight was introduced into the bottom of a vertical reactor containing 900 parts of granular sodium chloride. The reactor was maintained at about 400° C. The reaction proceeded smoothly. The gaseous product stream discharged from the top of the vertical reactor was composed of ethyl chloride, hydrogen chloride, dichloroethane, sulfur dioxide, unreacted ethane, some carbon dioxide and inert gases. A molten mixture of sodium pyrosulfate and sodium chloride was collected. It contained about 15 percent sodium chloride on a weight basis. Approximately 25 percent of the ethane was reacted in each pass over the reaction salts. Approximately 90 percent of the chlorinated product was ethyl chloride.

The gases leaving the top of the reactor were cooled to condense out the chlorinated compounds. These were fractionated to recover ethyl chloride and other products.

The molten salts from the reactor were heated to 500° C. in order to decompose the sodium pyrosulfate to sodium sulfate. The sulfur trioxide evolved was sent back to the vertical reactor.

417 parts of the solid salts which contained about 15 percent sodium chloride was added to 360 parts water, and the gas from the chlorinated organic compounds removal apparatus which is composed of hydrogen chloride, sulfur dioxide, and inert gases was passed through this slurry until 182 parts of hydrogen chloride was absorbed. The slurry was stirred for approximately one hour and filtered to remove 325 parts of sodium chloride. This represents a yield of approximately 90 percent based on the amount of sodium sulfate used. The mother liquor is composed of approximately 220 parts sulfuric acid, 28.2 parts of sodium chloride and 360 parts water. This solution is heated to evolve about 18 parts of HCl which is sent back to the next cycle. The solution is evaporated to remove a small amount of water and filtered to remove approximately 60 parts of sodium acid sulfate ($NaHSO_4$). The solution is composed of 172 parts of sulfuric acid and 200 parts water. This solution was added to 28 parts elemental sulfur and the temperature was raised to 250–300° C. to cause the evolution of 168 parts of sulfur dioxide. This gas was sent back to the oxidizer to produce sulfur trioxide.

While I have described the halogenation of the organic compound as having been effected simultaneously with the production of mixtures of sulfur dioxide and chlorine, it will be readily apparent to those skilled in the art that the latter, or sulfuryl chloride may be produced in a separate reaction vessel under optimum conditions for reaction (I) or (Ia) above and subsequently reacted with the organic compound to be halogenated in a second stage, carried out at a temperature and pressure quite different from that employed in the first stage. Thus, by separating reactions (I) or (Ia) from reaction (II) above, it becomes possible to achieve greater flexibility in the overall process.

The mixture of salts as obtained from the first step in my overall process may be reacted with hydrogen chloride to produce sodium chloride and sulfuric acid, or the solid salts from the reactor may be separated by well known procedures, and then the separated sulfate or acid sulfate may be reacted with hydrogen chloride as above described. Instead, if preferred, the mixed salts from the reactor which are composed of sodium sulfate, sodium acid sulfate and sodium chloride may be heated to a somewhat higher temperature to cause the evolution of hydrogen chloride, and the resulting mixture of sodium sulfate and sodium chloride may be either reacted with hydrogen chloride, or may be separated to recover the sodium chloride and sodium sulfate separately. The sodium sulfate so-recovered may then be reacted directly with hydrogen chloride to produce sodium chloride for reaction in the initial stages of my process.

I claim:

1. In a process for producing halogenated hydrocarbons which comprises: bringing into contact an alkali metal halide in solid form and a hydrocarbon in the presence of sulfur trioxide at an elevated temperature in a first reaction zone; maintaining the reactants therein at an elevated temperature whereby a halogen substituted hydrocarbon, sulfur dioxide and a hydrogen halide are produced as gaseous reaction products and an alkali metal sulfate is produced as a nongaseous reaction product; withdrawing the gaseous products mixture; recovering the halogen substituted hydrocarbon from the gaseous products in a first separation; recovering an aqueous solution of the hydrogen halide content of said gaseous products in a second separation; and withdrawing the alkali metal sulfate in molten form from said zone; the improvement which comprises: cooling the molten alkali sulfate sufficiently to solidify the sulfate and then adding the solid alkali metal sulfate to the separated aqueous solution of hydrogen halide in an amount substantially sufficient to convert substantially all of the alkali metal sulfate to alkali metal halide; cooling the resulting solution to room temperature to precipitate the alkali metal halide formed therein; separating the alkali metal halide precipitate from said solution; and recycling said precipitated alkali metal halide to said first reaction zone in a repetition of the process.

2. In a process for producing chlorinated hydrocarbons which comprises: bringing into contact an alkali metal chloride in solid form and a hydrocarbon in the presence of sulfur trioxide at an elevated temperature in a first reaction zone; maintaining the reactants therein at an elevated temperature whereby a chlorinated hydrocarbon, sulfur dioxide and hydrogen chloride are produced as gaseous reaction products and an alkali metal sulfate is produced as a nongaseous reaction product; withdrawing the gaseous products mixture; recovering the chlorinated hydrocarbon from the gaseous products in a first separation; recovering an aqueous solution of the hydrogen chloride content of said gaseous products in a second separation; and withdrawing the alkali metal sulfate in molten form from said zone; the improvement which comprises: cooling the molten alkali metal sulfate sufficiently to solidify the sulfate and then adding the solid alkali metal sulfate to the aqueous solution of hydrogen chloride in an amount substantially sufficient to convert substantially all of the alkali metal sulfate to alkali metal chloride; cooling the resulting solution to room temperature to precipitate the alkali metal chloride formed therein; separating the alkali metal chloride precipitate from said solution; and recycling said precipitated alkali metal chloride to said first reaction zone in a repetition of the process.

3. In a process for producing halogenated ethanes which comprises: bringing into contact an alkali metal halide in solid form and ethane in the presence of sulfur trioxide at an elevated temperature in a first reaction zone; maintaining the reactants therein at an elevated temperature whereby a halogen substituted ethane, sulfur dioxide and a hydrogen halide are produced as gaseous reaction products and an alkali metal sulfate is produced as a nongaseous reaction product; withdrawing the gaseous products mixture; recovering the halogen substituted ethane from the gaseous products in a first separation; recovering an aqueous solution of the hydrogen halide content of said gaseous products in a second separation; and withdrawing the alkali metal sulfate in molten form from said zone; the improvement which comprises: cooling the molten alkali metal sulfate sufficiently to solidify the sulfate and then adding the solid alkali metal sulfate to the aqueous solution of hydrogen halide in an amount substantially sufficient to convert substantially all of the alkali metal sulfate to alkali metal halide; cooling the resulting solution to room temperature to precipitate the alkali metal halide formed therein; separating the alkali metal halide precipitate from said solution; and recycling said precipitated alkali metal halide to said first reaction zone in a repetition of the process.

4. The process of claim 3 in which the alkali metal halide is sodium chloride and the product is a chlorinated ethane.

References Cited in the file of this patent
UNITED STATES PATENTS 2,698,347    Giraitis _____ Dec. 28, 1954

OTHER REFERENCES

Cumming: "Manufacture of Hydrochloric Acid and Saltcake," pages 47 and 48 (1923), Van Nostrand Co., New York.

Jones: "Inorganic Chemistry," The Blakiston Co., Philadelphia, 1947, pages 159 and 404.

UNITED STATES PATENT OFFICE
CERTIFICATE OF CORRECTION

Patent No. 2,820,068 January 14, 1958

George L. Cunningham

It is hereby certified that error appears in the printed specification of the above numbered patent requiring correction and that the said Letters Patent should read as corrected below.

Column 4, line 11, strike out "slurry of"; column 6, line 37, claim 1, for "recovering" read -- cooling and separating --; line 38, before "gaseous" insert -- accompanying --; line 39, strike out "an aqueous solution"; line 40, strike out "of", first occurrence; line 44, for "adding" read -- mixing --; line 45, for "to the separated" read -- with an --; line 46, before "hydrogen" insert -- the separated --; same line strike out "an amount substantially sufficient" and insert instead -- the relative proportions of about one mol of sulfate for each two mols of hydrogen halide --; same column 6, line 63, claim 2, for "recovering" read -- cooling and separating --; line 64, before "gaseous" insert -- accompanying --; line 65, strike out "an aqueous solution of"; line 70, for "adding" read -- mixing --; line 71, for "to the" read -- with an --; same line, before "hydrogen" insert -- the separated --; line 72, strike out "an amount substantially sufficient" and insert instead -- the relative proportions of about one mol of sulfate for each two mols of hydrogen chloride --; column 7, line 14, claim 3, for "recovering" read -- cooling and separating --; line 15, before "gaseous" insert -- accompanying --; line 16, strike out "an aqueous solution of"; line 21, for "adding" read -- mixing --; line 22, for "to the" read -- with an --; same line, before "hydrogen" insert -- the separated --; same column 7, line 22, and column 8, line 1, strike out "an amount substantially sufficient" and insert instead -- the relative proportions of about one mol of sulfate for each two mols of hydrogen halide --.

Signed and sealed this 1st day of April 1958.

(SEAL)
Attest:

KARL H. AXLINE

Attesting Officer

ROBERT C. WATSON

Commissioner of Patents